United States Patent [19]
Hüffer et al.

[11] Patent Number: 6,156,691
[45] Date of Patent: Dec. 5, 2000

[54] ZIEGLER-NATTA CATALYST SYSTEMS MODIFIED DURING THEIR PREPARATION

[75] Inventors: Stephan Hüffer, Ludwigshafen; Ulrich Moll, St Martin; Ian David McKenzie, Welwyn Garden City; Franz Langhauser, Ruppertsberg; Peter Kölle, Bad Dürkheim; Roland Hingmann, Ladenberg; Günther Schweier, Friedelsheim; Rainer Hemmerich, Grünstadt; Jürgen Kerth, Carlsberg, all of Germany

[73] Assignee: BASF Aktiengesellschaft, Ludwigshafen, Germany

[21] Appl. No.: 08/928,394

[22] Filed: Sep. 12, 1997

[30] Foreign Application Priority Data

Sep. 13, 1996 [DE] Germany ............ 196 37 370

[51] Int. Cl.[7] .................................... B01J 31/00
[52] U.S. Cl. ................ 502/120; 502/115; 502/133; 502/127; 502/125; 526/142; 526/124.2
[58] Field of Search ................ 502/120, 115, 502/133, 127, 125; 526/142, 124.2

[56] References Cited

U.S. PATENT DOCUMENTS

| | | | |
|---|---|---|---|
| 4,857,613 | 8/1989 | Zolk et al. | |
| 4,942,148 | 7/1990 | Furuhashi et al. | 526/124.6 |
| 5,288,824 | 2/1994 | Kerth et al. | |
| 5,744,567 | 4/1998 | Huffer et al. | 526/348.6 |

FOREIGN PATENT DOCUMENTS

| | | |
|---|---|---|
| 171 200 | 2/1986 | European Pat. Off. |
| 195497 | 9/1986 | European Pat. Off. ............ 526/124.6 |
| 530 599 | 3/1993 | European Pat. Off. |
| 42 16 548 | 11/1993 | Germany. |
| 195 17 716 | 12/1995 | Germany. |
| 2101610 | 1/1983 | United Kingdom. |
| 2 111 066 | 6/1983 | United Kingdom. |
| 93/23440 | 11/1993 | WIPO. |

*Primary Examiner*—David W. Wu
*Assistant Examiner*—Ling-Siu Choi
*Attorney, Agent, or Firm*—Keil & Weinkauf

[57] ABSTRACT

In catalyst systems of the Ziegler-Natta type modified during their preparation and comprising as active constituents a) a titanium-containing solid component which is obtained by reacting a compound of titanium with a compound of magnesium, a halogen, an inorganic oxide as support, a $C_1$–$C_8$-alkanol and a carboxylic ester as electron donor compound, and also as cocatalyst b) an aluminum compound and c) if desired, a further electron donor compound, the titanium-containing solid component a) is prepared by first, in a first stage, admixing an inorganic oxide as support with a solution of a chlorine-free compound of magnesium in an inert solvent, stirring this mixture for from 0.5 to 5 hours at from 10 to 120° C. and subsequently reacting it while stirring continually in an inert solvent with a $C_1$–$C_8$-alkanol in an at least 1.3-fold excess, based on the compound of magnesium, to give a chlorine-free intermediate, then, without purification or extraction of the intermediate, adding a compound of trivalent or tetravalent titanium and a carboxylic ester as electron donor compound to this intermediate, stirring the resulting mixture for at least 30 minutes at from 20 to 130° C., subsequently filtering off and washing the solid thus obtained and subsequently, in a second stage, extracting the solid obtained from the first stage in an inert solvent comprising at least 5% by weight of titanium tetrachloride and washing it with a liquid alkane.

10 Claims, No Drawings

ZIEGLER-NATTA CATALYST SYSTEMS MODIFIED DURING THEIR PREPARATION

The present invention relates to catalyst systems of the Ziegler-Natta type modified during their preparation and comprising as active constituents a) a titanium-containing solid component which is obtained by reacting a compound of titanium with a compound of magnesium, a halogen, an inorganic oxide as support, a $C_1$–$C_8$-alkanol and a carboxylic ester as electron donor compound, and also as cocatalyst b) an aluminum compound and c) if desired, a further electron donor compound, wherein the titanium-containing solid component a) is prepared by first, in a first stage, admixing an inorganic oxide as support with a solution of a chlorine-free compound of magnesium in an inert solvent, stirring this mixture for from 0.5 to 5 hours at from 10 to 120° C. and subsequently reacting it while stirring continually in an inert solvent with a $C_1$–$C_8$-alkanol in an at least 1.3-fold excess, based on the compound of magnesium, to give a chlorine-free intermediate, then, without purification or extraction of the intermediate, adding a compound of trivalent or tetravalent titanium and a carboxylic ester as electron donor compound to this intermediate, stirring the resulting mixture for at least 30 minutes at from 20 to 130° C., subsequently filtering off and washing the solid thus obtained and subsequently, in a second stage, extracting the solid obtained from the first stage in an inert solvent comprising at least 5% by weight of titanium tetrachloride and washing it with a liquid alkane.

The present invention further provides a process for preparing such Ziegler-Natta catalyst systems, the preparation of polymers of propylene with the aid of these catalyst systems, the polymers obtainable in this way and also films, fibers and moldings comprising these polymers.

Catalyst systems of the Ziegler-Natta type are known, for example, from DE-A 42 16 548, DE-A 44 19 438, EP-A 530 599 and U.S. Pat. No. 4,857,613. These systems are used, in particular, for the polymerization of $C_2$–$C_{10}$-alk-1-enes and comprise, inter alia, compounds of polyvalent titanium, aluminum halides and/or alkyls, and also electron donor compounds, in particular silicon compounds, ethers, carboxylic esters, ketones and lactones which are used both in connection with the titanium component and also as cocatalyst.

The Ziegler-Natta catalysts are customarily prepared in two steps. The titanium-containing solid component is prepared first and is subsequently reacted with the cocatalyst. The polymerization is subsequently carried out with the aid of the catalysts thus obtained.

U.S. Pat. No. 4,857,613 and U.S. Pat. No. 5,288,824 describe catalyst systems of the Ziegler-Natta type which comprise a titanium-containing solid component and an aluminum compound plus organic silane compounds as external electron donor compounds. The catalyst systems thus obtained display, inter alia, a good productivity and give polymers of propylene having a high stereospecificity, ie. a high isotacticity, a low chlorine content and a good morphology, ie. a low proportion of fines.

According to U.S. Pat. No. 4,857,613 and U.S. Pat. No. 5,288,824, the titanium-containing solid component is prepared in a multistage process in which large amounts of titanium- and chlorine-containing starting materials are consumed and the subsequent disposal and reprocessing of these considerably increases the production costs. In addition, the preparation of the titanium-containing solid component is relatively time-consuming since, inter alia, the intermediate obtained in the first stage has to be purified or extracted.

Furthermore, it is important in the polymerization of alk-1-enes that the Ziegler-Natta catalyst systems used always display as high as possible a productivity and stereospecificity, ie. very low xylene- and heptane-soluble fractions.

It is an object of the present invention to remedy the disadvantages indicated and to develop an improved Ziegler-Natta catalyst system which, inter alia, displays a high productivity and stereospecificity and can be prepared by a process which is very simple and consumes little time, and enables the amount of titanium- and chlorine-containing starting materials to be reduced.

We have found that this object is achieved by the catalyst systems of the Ziegler-Natta type defined in the introduction.

The catalyst systems of the present invention comprise, inter alia, a titanium-containing solid component a) and a cocatalyst. A suitable cocatalyst is the aluminum compound b). Apart from this aluminum compound b), an electron donor compound c) is preferably used as a further constituent of the cocatalyst.

Titanium compounds used for preparing the titanium-containing solid component a) are generally halides or alkoxides of trivalent or tetravalent titanium, with preference being given to the chlorides of titanium, in particular titanium tetrachloride. The titanium-containing solid component further comprises a support.

Furthermore, compounds of magnesium are used, among other things, in the preparation of the titanium-containing solid component. Suitable magnesium compounds are, in particular, chlorine-free compounds of magnesium, eg. magnesium alkyls and magnesium aryls, and also magnesium alkoxy and magnesium aryloxy compounds, with preference being given to using di($C_1$–$C_{10}$-alkyl)magnesium compounds, eg. n-butyloctylmagnesium or n-butylethylmagnesium. In addition, the titanium-containing solid component can further comprise halogen, preferably chlorine or bromine.

The titanium-containing solid component a) further comprises electron donor compounds, for example monofunctional or polyfunctional carboxylic acids, carboxylic anhydrides and carboxylic esters, also ketones, ethers, alcohols, lactones and organophosphorus and organosilicon compounds. As electron donor compounds within the titanium-containing solid component, preference is given to using phthalic acid derivatives of the general formula (II),

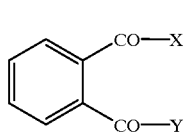

(II)

where X and Y are each a chlorine atom or a $C_1$–$C_{10}$-alkoxy radical or together are oxygen. Particularly preferred electron donor compounds are phthalic esters where X and Y are each a $C_1$–$C_8$-alkoxy radical, for example a methoxy, ethoxy, propyloxy or butyloxy radical.

Further preferred electron donor compounds within the titanium-containing solid components are, inter alia, diesters of 3- or 4-membered, substituted or unsubstituted cycloalkyl-1,2-dicarboxylic esters, and also monoesters of substituted or unsubstituted benzophenone-2-carboxylic acids. The hydroxy compounds used in these esters are the alcohols customary in esterification reactions, for example $C_1$–$C_{15}$-alkanols and $C_5$–$C_7$-cycloalkanols which can in turn bear $C_1$–$C_{10}$-alkyl groups, also $C_6$–$C_{10}$-phenols.

The titanium-containing solid component can be prepared by methods known per se. Examples are described, inter alia, in EP-A 171 200, GB-A 2 111 066, U.S. Pat. No. 4,857,613 and U.S. Pat. No. 5,288,824.

In the preparation of the titanium-containing solid component a), the following two-stage process is preferably employed:

In the first stage, an inorganic oxide which in general has a pH of from 1 to 6.5, a mean particle diameter of from 5 to 200 mm, in particular from 20 to 70 $\mu$m, a pore volume of from 0.1 to 10 cm$^3$/g, in particular from 1.0 to 4.0 cm$^3$/g, and a specific surface area of from 10 to 1000 m$^2$/g, in particular from 100 to 500 m$^2$/g, is first admixed with a solution of a chlorine-free magnesium-containing compound in an inert solvent, preferably a liquid alkane or an aromatic hydrocarbon, eg. toluene or ethylbenzene, after which this mixture is stirred for from 0.5 to 5 hours at from 10 to 120° C. Preference is given to using from 0.1 to 1 mol of the magnesium compound per mol of the support. Subsequently, a $C_1$–$C_8$-alkanol, in particular ethanol, in an at least 1.3-fold, preferably at least 1.6-fold, in particular 1.8-fold, excess, based on the magnesium-containing compound, is added thereto while stirring continually, in particular at from −20 to +80° C., preferably from 0 to +40° C. This gives a chlorine-free intermediate which is processed further without purification or extraction. After from about 30 to 120 minutes, a compound of trivalent or tetravalent titanium, in particular titanium tetrachloride, and a carboxylic ester as electron donor compound are added to this intermediate at from 10 to 50° C. From 1 to 15 mol, preferably from 2 to 5 mol, of trivalent or tetravalent titanium and from 0.01 to 1 mol, in particular from 0.3 to 0.7 mol, of the electron donor compound are used per mol of magnesium in the solid obtained from the first stage. This mixture is stirred for at least 30 minutes at from 10 to 150° C., the solid thus obtained is subsequently filtered off and washed with a $C_7$–$C_{10}$-alkylbenzene, preferably with ethylbenzene.

In the second stage, the solid obtained from the first stage is extracted for at least 30 minutes at from 100 to 150° C. with excess titanium tetrachloride or an excess of a solution of titanium tetrachloride in an inert solvent, preferably a $C_7$–$C_{10}$-alkylbenzene, with the solvent comprising at least 5% by weight of titanium tetrachloride. The product is then washed with a liquid alkane until the titanium tetrachloride content of the washing liquid is less than 2% by weight.

The use of a chlorine-free compound of magnesium in an inert solvent in the first stage of the preparation and the reaction of this with the support and the $C_1$–$C_8$-alkanol to give a chlorine-free intermediate which is further processed without purification or extraction are essential to the Ziegler-Natta catalyst system of the present invention.

In the titanium-containing solid component a), the inorganic oxide used as support is preferably a finely divided inorganic oxide having a pH of from 1 to 6.5, a mean particle diameter of from 5 to 200 $\mu$m, in particular from 20 to 70 $\mu$m and a mean particle diameter of the primary particles of from 1 to 20 $\mu$m, in particular from 1 to 5 $\mu$m. The primary particles mentioned here are porous, granular oxide particles which are obtained by milling, if desired after appropriate sieving, from a corresponding hydrogel. The hydrogel is produced in the acid range, ie. in a pH range from 1 to 6.5, or else is after-treated with appropriate acid washing solutions and purified.

Furthermore, the finely divided inorganic oxide which is preferably used also has voids or channels having a mean diameter of from 0.1 to 20 $\mu$m, in particular from 1 to 15 $\mu$m, which voids or channels are present in a macroscopic proportion by volume of the total particle in the range from 5 to 30%, in particular in the range from 10 to 30%. The finely divided inorganic oxide also has, in particular, a pore volume of from 0.1 to 10 cm$^3$/g, preferably from 1.0 to 4.0 cm$^3$/g, and a specific surface area of from 10 to 1000 m$^2$/g, preferably from 100 to 500 m$^2$/g. The pH, ie. the negative logarithm to the base ten of the proton concentration, of the inorganic oxide is in the range from 1 to 6.5, in particular in the range from 2 to 6, particularly preferably in the range from 3.5 to 5.5.

Preferred inorganic oxides are, in particular, oxides of silicon, aluminum, titanium or one of the metals of main groups I. and II. of the Periodic Table. Apart from aluminum oxide or magnesium oxide or a sheet silicate, a particularly preferred oxide is silica gel (SiO$_2$), with this being able to be obtained, in particular, by spray drying. It is also possible to use cogels, ie. mixtures of two different inorganic oxides.

The inorganic oxide is preferably present in the titanium-containing solid component a) in such amounts that from 0.1 to 1.0 mol, in particular from 0.2 to 0.5 mol, of the compound of magnesium are present per 1 mol of the inorganic oxide.

The titanium-containing solid component obtainable in this way is used together with a cocatalyst as Ziegler-Natta catalyst system. A suitable cocatalyst is, for example, an aluminum compound b).

Aluminum compounds b) suitable as cocatalysts are trialkylaluminum and also those compounds in which an alkyl group has been replaced by an alkoxy group or by a halogen atom, for example by chlorine or bromine. Preference is given to using trialkylaluminum compounds whose alkyl groups each have from 1 to 8 carbon atoms, for example trimethylaluminum, triethylaluminum or methyldiethylaluminum.

Preference is given to using, in addition to the aluminum compound b), an electron donor compound c) as further cocatalyst. Examples of such electron donor compounds c) are monofunctional or polyfunctional carboxylic acids, carboxylic anhydrides and carboxylic esters, also ketones, ethers, alcohols, lactones and organophosphorus and organosilicon compounds. Preferred electron donor compounds are organosilicon compounds of the general formula (I)

$$R^1{}_n Si(OR^2)_{4-n} \qquad (I)$$

where

R$^1$ are identical or different and are each a $C_1$–$C_{20}$-alkyl group, a 5- to 7-membered cycloalkyl group which can in turn bear a $C_1$–$C_{10}$-alkyl group, or a $C_6$–$C_{20}$-aryl or arylalkyl group, R$^2$ are identical or different and are each a $C_1$–$C_{20}$-alkyl group and n is 1, 2 or 3. Particular preference is here given to those compounds in which R$^1$ is a $C_1$–$C_8$-alkyl group or a 5- to 7-membered cycloalkyl group and R$^2$ is a $C_1$–$C_4$-alkyl group and n is 1 or 2.

Among these compounds, particular preference may be given to dimethoxydiisopropylsilane, dimethoxyisobutylisopropylsilane, dimethoxydiisobutylsilane, dimethoxydicyclopentylsilane, dimethoxyisobutyl-sec-butylsilane, dimethoxyisopropyl-sec-butylsilane, diethoxydicyclopentylsilane and diethoxy-isobutylisopropylsilane.

The individual compounds b) and, if used, c) can be used as cocatalyst in any order either individually or as a mixture of two components.

The compounds b) and, if desired, c) acting as cocatalysts can be allowed to act either successively or together on the titanium-containing solid component a). This usually occurs at from 0 to 150° C., in particular from 20 to 90° C., and pressures of from 1 to 100 bar, in particular from 1 to 40 bar.

The cocatalysts b) and, if used, c) are preferably employed in such an amount that the atomic ratio of aluminum from the aluminum compound to titanium from the titanium-containing solid component a) is from 10:1 to 800:1, in particular from 20:1 to 200:1, and the molar ratio of the aluminum compound to the electron donor compound c) used as cocatalyst is from 1:1 to 250:1, in particular from 10:1 to 80:1.

The catalyst systems of the present invention are used for preparing polymers of $C_2$–$C_{10}$-alk-1-enes. They are particularly suitable for preparing polymers of propylene and ethylene, ie. corresponding homopolymers and copolymers of these monomers together with other $C_2$–$C_{10}$-alk-1-enes. The proportion of the monomers propylene or ethylene in the copolymers is here at least 50 mol %.

For the purposes of the present invention, $C_2$–$C_{10}$-alk-1-enes are, inter alia, ethylene, propylene, 1-butene, 1-pentene, 1-hexene, 1-heptene or 1-octene, with the comonomers ethylene, propylene and 1-butene being particularly preferred.

However, the catalyst systems of the present invention can also be used for preparing polymers of other $C_2$–$C_{10}$-alk-1-enes, for example for preparing homopolymers or copolymers of 1-butene, 1-pentene, 1-hexene, 1-heptene or 1-octene.

The catalyst system of the present invention is preferably used to prepare polymers consisting of from 50 to 100 mol % of propylene, from 0 to 50 mol %, in particular from 0 to 30 mol %, of ethylene and from 0 to 20 mol %, in particular from 0 to 10 mol %, of $C_4$–$C_{10}$-alk-1-enes. The sum of the molar percentages is always 100.

The preparation of such polymers of $C_2$–$C_{10}$-alk-1-enes can be carried out in the customary reactors used for the polymerization of $C_2$–$C_{10}$-alk-1-enes, either batchwise or preferably continuously, for example as a suspension polymerization or preferably as a gas-phase polymerization. Suitable reactors include continuously operated stirred reactors containing a fixed bed of finely divided polymer which is customarily kept in motion by suitable agitators. Of course, it is also possible to carry out the reaction in a plurality of reactors connected in series (reactor cascade). The reaction time is very dependent on the reaction conditions selected in each case. It is normally from 0.2 to 20 hours, usually from 0.5 to 10 hours.

The polymerization reaction is advantageously carried out at from 20 to 150° C. and at pressures of from 1 to 100 bar. Preference is given to temperatures of from 40 to 100° C. and pressures of from 10 to 50 bar. The molar mass of the polyalk-1-enes formed can be controlled by addition of regulators customary in polymerization technology, for example hydrogen, and can be set over a wide range. Furthermore, it is possible to make concomitant use of inert solvents such as toluene or hexane, inert gas such as nitrogen or argon and relatively small amounts of polypropylene powder.

The propylene homopolymers and copolymers obtained with the aid of the catalyst system of the present invention are obtainable in the molar masses customary for polyalk-1-enes, with polymers having molar masses (weight average) of from 20 000 to 500 000 being preferred. Their melt flow indices at 230° C. and under a weight of 2.16 kg, in accordance with DIN 53 735, are in the range from 0.1 to 100 g/10 min, in particular in the range from 0.5 to 50 g/10 min.

In comparison with the catalyst systems known hitherto, the Ziegler-Natta catalyst system of the present invention displays an increased productivity and an excellent stereospecificity, particularly in gas-phase polymerizations. The polymers obtainable in this manner also have a high bulk density, low heptane- and xylene-soluble fractions and a low residual chlorine content.

In the likewise novel process used for their preparation, the halogenation step for the compound of magnesium and time-consuming purification and extraction steps for the intermediate can be omitted. Apart from the time savings achieved in this way, the amount of titanium- and chlorine-containing starting materials can be significantly reduced using this likewise novel process.

Owing to their good mechanical properties, the propylene polymers prepared using the catalyst system of the present invention are especially suitable for the production of films, fibers and moldings.

EXAMPLES

Example 1 a) Preparation of the titanium-containing solid component (1)

In a first stage, finely divided, spherical silica gel ($SiO_2$) having a particle diameter of from 20 to 45 µm, a pore volume of 1.5 cm$^3$/g and a specific surface area of 260 m$^2$/g was admixed with a solution of n-butyloctylmagnesium in n-heptane, with 0.3 mol of the magnesium compound being used per mol of $SiO_2$. The mixture was stirred for 30 minutes at 95° C., then cooled to 20° C. after which the 1.8-fold molar amount, based on the organomagnesium compound, of ethanol in 20 ml of heptane was added while cooling, with the reaction temperature being kept below 45° C. After 45 minutes, the chlorine-free intermediate was, without a purification or extraction step, admixed while stirring continually with 4.2 mol of titanium tetrachloride and 0.5 mol of di-n-butyl phthalate, in each case based on 1 mol of magnesium. The mixture was subsequently stirred for 1 hour at 100° C., the solid thus obtained was filtered off and washed a number of times with ethylbenzene.

The resulting solid product was, in a second stage, extracted for 60 minutes at 1250C with a 10% strength by volume solution of titanium tetrachloride in ethylbenzene. The solid product Was then separated from the extractant by filtration and washed with n-heptane until the extractant contained only 0.3% by weight of titanium tetrachloride.

The titanium-containing solid component contained
3.8% by weight of Ti
7.2% by weight of Mg
28.1% by weight of Cl.

The particle diameter was determined by Coulter Counter analysis (particle size distribution of the silica gel particles), and the pore volume and the specific surface area were determined by nitrogen adsorption in accordance with DIN 66131 or by mercury porosimetry in accordance with DIN 66133. The macroscopic proportion by volume of the voids and channels in the silica gel used was determined by means of scanning electron microscopy or electron probe microanalysis.

b) Polymerization of propylene

The polymerization was carried out in the gas phase in the presence of hydrogen as molecular weight regulator in an autoclave reactor fitted with a stirrer and having a utilizable capacity of 10 l.

At 70° C. and a pressure of 28 bar, gaseous propylene was introduced in the presence of 8 l of hydrogen into the gas-phase reactor. The polymerization was carried out at a residence time of one hour with the aid of the titanium-containing solid component a) described in Example 1a, with 100 mg of the titanium-containing solid component a), 10 mmol of triethylaluminum and 1 mmol of dimethoxyisobutylisopropylsilane as cocatalyst being used.

After the gas-phase polymerization was complete, a propylene homopolymer having a melt flow index of 11.2 g/10 min at 230° C. and 2.16 kg (in accordance with DIN 53 735) was obtained.

Table 2 below shows the productivity of the catalyst system used (amount of polymer obtained in gram/amount of titanium-containing solid component used in gram), the amounts of xylene- and heptane-soluble material, the chlorine content, the melt flow index and the bulk density for the propylene homopolymer obtained.

Comparative Example A

A titanium-containing solid component was first prepared and propylene was then polymerized, both under conditions identical to those in Example 1 according to the invention except that the magnesium-containing compound was treated for more than 90 minutes with 5 times the molar amount, based on the magnesium-containing compound, of hydrogen chloride. The intermediate resulting after the reaction of the magnesium chloride formed with the ethanol, the titanium tetrachloride and the phthalic ester was subsequently treated for 180 minutes at 125° C. with an extraction mixture consisting of 90% by volume of ethylbenzene and 10% by volume of titanium tetrachloride.

Table 1 below shows, for Example 1 according to the present invention and for Comparative Example A, the solvent, magnesium compound and support (with the proportion by volume of pores) used in the preparation of the titanium-containing solid component a) and the contents of magnesium, titanium and chlorine in the titanium-containing solid component a).

Table 2 contains the data in respect of the productivity of the catalyst system used, the proportions of xylene- and heptane-soluble material in the propylene homopolymer obtained and also the chlorine content, melt flow index and bulk density of the latter.

Examples 2 to 4 and Comparative Examples B and D

In the further Examples 2 to 4 according to the present invention, a titanium-containing solid component a) was first prepared and propylene was then polymerized, in each case using a method similar to Example 1. Likewise, in the Comparative Examples B to D, a titanium-containing solid component a) was first prepared and propylene was then polymerized, in each case using a method similar to Comparative Example A.

Table 1 below shows, both for Examples 1 to 4 according to the present invention and for Comparative Examples A to D, the compound of magnesium used, the solvent used in the preparation of the titanium-containing solid component, the content of magnesium, titanium and chlorine in the latter and also the support used (with the proportion by volume of pores).

Table 2 shows, for the propylene homopolymer obtained in Examples 1 to 4 and Comparative Examples A to D, the productivity of the catalyst system used (amount of polymer obtained in gram/amount of titanium-containing solid component used in gram), the proportions of xylene- and heptane-soluble material, the chlorine content, the melt flow index and the bulk density.

TABLE 1

| | Titanium-containing solid component | | | | | |
|---|---|---|---|---|---|---|
| | Solvent in the preparation of the titanium-containing solid component a) | Magnesium compound used | Support used and its macroscopic proportion by volume in the total particle [%] | Elemental content in the titanium-containing solid component a) [%] | | |
| | | | | Mg | Ti | Cl |
| Example 1 | n-Heptane | n-Butyloctyl-magnesium | $SiO_2$, 15 | 7.2 | 3.8 | 28.1 |
| Comparative Example A | n-Heptane | n-Butyloctyl-magnesium | $SiO_2$, 15 | 7.3 | 3.5 | 27.9 |
| Example 2 | Ethylbenzene | n-Butyloctyl-magnesium | $SiO_2$, 15 | 7.1 | 4.0 | 28.8 |
| Comparative Example B | Ethylbenzene | n-Butyloctyl-magnesium | $SiO_2$, 15 | 7.4 | 3.7 | 28.5 |
| Example 3 | n-Heptane | n-Butylethyl-magnesium | $SiO_2$; 15 | 7.1 | 3.5 | 28.2 |
| Comparative Example C | n-Heptane | n-Butylethyl-magnesium | $SiO_2$; 15 | 7.3 | 3.5 | 28.4 |
| Example 4 | Ethylbenzene | n-Butyloctyl-magnesium | $SiO_2$; 20 | 7.3 | 4.4 | 29.0 |
| Comparative Example D | Ethylbenzene | n-Butyloctyl-magnesium | $SiO_2$; 20 | 7.5 | 4.0 | 28.6 |

TABLE 2

Properties of the propylene polymers obtained

| | Productivity [g of polymer/g of titanium-solid component] | Xylene-soluble fraction [% by weight] | Heptane-soluble fraction [% by weight] | Chlorine content [ppm] | Melt flow index *) [g/10 min] | Bulk density [g/l] |
|---|---|---|---|---|---|---|
| Example 1 | 16800 | 0.6 | 0.9 | 17 | 11.2 | 420 |
| Comparative Example A | 16400 | 0.8 | 1.5 | 17 | 12.9 | 435 |
| Example 2 | 19200 | 0.6 | 1.0 | 15 | 10.9 | 415 |
| Comparative Example B | 17900 | 0.9 | 1.8 | 16 | 11.9 | 420 |
| Example 3 | 15300 | 0.7 | 1.1 | 18 | 11.0 | 440 |
| Comparative Example C | 14100 | 1.0 | 2.1 | 20 | 11.6 | 450 |
| Example 4 | 21100 | 0.7 | 1.0 | 13.5 | 11.8 | 410 |
| Comparative Example D | 18600 | 0.9 | 1.5 | 15 | 12.7 | 425 |

*) at 230° C. and 2.16 kg, in accordance with DIN 53735

It can be seen from Tables 1 and 2 that the concomitant use of a chlorine-free intermediate (obtained by avoiding the introduction of hydrogen chloride) in the preparation of the titanium-containing solid component a) leads to Ziegler-Natta catalyst systems which display, inter alia, an increased productivity and stereospecificity (lower xylene- and heptane-soluble fractions). The polymers of propylene thus obtained have, inter alia, reduced chlorine contents. Furthermore, the likewise novel preparative process as described in Examples 1 to 4 has production times about 25% less than those in Comparative Examples A to D. In addition, in the Examples 1 to 4 according to the present invention the amount of titanium tetrachloride used can be reduced by from 20 to 40% compared with Comparative Examples A to D.

We claim:

1. A catalyst system of the Ziegler-Natta type consisting essentially of as active constituents
   a) a titanium-containing solid component which is obtained by reacting a compound of titanium with a compound of magnesium, an inorganic oxide as support, a $C_1$–$C_8$-alkanol and a carboxylic ester as electron donor compound,
   and also as cocatalyst
   b) an aluminum compound and
   c) optionally a further electron donor compound, wherein the titanium-containing solid component a) is prepared by first, in a first stage, admixing an inorganic oxide as support with a solution of a chlorine-free compound of magnesium in an inert solvent, stirring this mixture for from 0.5 to 5 hours at from 10 to 120° C. and subsequently reacting it at from −20 to +80° C. while stirring continually in an inert solvent with a $C_1$–$C_8$-alkanol in a 1.3 to 1.8-fold molar amount excess, based on the compound of magnesium, to give a chlorine-free intermediate, then, without purification or extraction of the intermediate, adding a compound of trivalent or tetravalent titanium and a carboxylic ester as electron donor compound to this intermediate, stirring the resulting mixture for at least 30 minutes at from 20 to 130° C., subsequently filtering off and washing the solid thus obtained and subsequently, in a second stage, extracting the solid obtained from the first stage in an inert solvent comprising at least 5% by weight of titanium tetrachloride and washing it with a liquid alkane.

2. A catalyst system as claimed in claim 1, wherein the $C_1$–$C_8$-alkanol used in the first stage of the preparation of the titanium-containing solid component a) is ethanol.

3. A catalyst system as claimed in claim 1, wherein the chlorine-free compound of magnesium used is a di ($C_1$–$C_{10}$-alkyl)magnesium.

4. A catalyst system as claimed in claim 1, wherein the inorganic oxide used as support has a pH of from 1 to 6, a mean particle diameter of from 5 to 200 μm and voids or channels having a mean diameter of from 1 to 20 μm and a macroscopic proportion by volume in the total particle in the range from 5 to 30%.

5. A catalyst system as claimed in claim 1, wherein the inorganic oxide used is spray dried.

6. A catalyst system as claimed in claim 1, wherein the inorganic oxide used is silica gel ($SiO_2$).

7. A catalyst system as claimed in claim 1, wherein the further electron donor compound c) used is an organosilicon compound of the general formula (I)

$$R^1{}_n Si(OR^2)_{4-n} \qquad (I),$$

where $R^1$ are identical or different and are each a $C_1$–$C_{20}$-alkyl group, a 5- to 7-membered cycloalkyl group which in turn can bear a $C_1$–$C_{10}$-alkyl group, or a $C_6$–$C_{20}$-aryl or arylalkyl group, $R^2$ are identical or different and are each a $C_1$–$C_{20}$-alkyl group and n is 1, 2 or 3.

8. A catalyst system as claimed in claim 1, wherein the aluminum compound b) used is a trialkylaluminum compound whose alkyl groups each have from 1 to 8 carbon atoms.

9. A process for preparing catalyst systems as claimed in claim 1, where the titanium-containing solid component a) is prepared by first, in a first stage, admixing an inorganic oxide as support with a solution of a compound of magnesium in an inert solvent, stirring this mixture for from 0.5 to 5 hours at from 10 to 120° C. and subsequently reacting it at from −20 to +80° C. while stirring continually in an inert solvent with a $C_1$–$C_8$-alkanol in a 1.3 to 1.8-fold molar amount excess, based on the compound of magnesium, to give a chlorine-free intermediate, then, without purification or extraction of the intermediate, adding a compound of trivalent or tetravalent titanium and a carboxylic ester as electron donor compound to this intermediate, stirring the resulting mixture for at least 30 minutes at from 20 to 130°

C., subsequently filtering off and washing the solid thus obtained and subsequently, in a second stage, extracting the solid obtained from the first stage in an inert solvent comprising at least 5% by weight of titanium tetrachloride and washing it with a liquid alkane, wherein, in the first stage, a chlorine-free compound of magnesium in an inert solvent is used and this is reacted with the support and the $C_1$–$C_8$-alkanol to give a chlorine-free intermediate which is processed further without purification or extraction.

10. The catalyst system of claim 1, wherein the compound of titanium is a halide or alkoxide of trivalent or tetravalent titanium.

\* \* \* \* \*